United States Patent
Levchenko et al.

(10) Patent No.: US 9,652,625 B1
(45) Date of Patent: May 16, 2017

(54) SYSTEM AND METHOD OF COUNTERACTING UNAUTHORIZED ACCESS TO MICROPHONE DATA

(71) Applicant: AO Kaspersky Lab, Moscow (RU)

(72) Inventors: Vyacheslav I. Levchenko, Moscow (RU); Alexander V. Kalinin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 15/201,978

(22) Filed: Jul. 5, 2016

(30) Foreign Application Priority Data

Apr. 25, 2016 (RU) .................. 2016116000

(51) Int. Cl.
| | |
|---|---|
| *G06F 21/00* | (2013.01) |
| *G06F 21/62* | (2013.01) |
| *G06F 21/31* | (2013.01) |
| *G06F 21/44* | (2013.01) |
| *G06F 17/30* | (2006.01) |

(52) U.S. Cl.
CPC .... *G06F 21/6209* (2013.01); *G06F 17/30755* (2013.01); *G06F 21/31* (2013.01); *G06F 21/44* (2013.01)

(58) Field of Classification Search
None
See application file for complete search history.

(56) References Cited

U.S. PATENT DOCUMENTS

| | | | |
|---|---|---|---|
| 5,920,833 A * | 7/1999 | Dierke | G11B 20/10527 704/222 |
| 6,026,402 A | 2/2000 | Vossen et al. | |
| 6,272,631 B1 * | 8/2001 | Thomlinson | G06F 21/6245 713/155 |
| 7,697,686 B2 * | 4/2010 | Puiatti | H04N 5/913 348/E7.056 |
| 8,463,612 B1 | 6/2013 | Neath et al. | |
| 8,650,578 B1 | 2/2014 | Binotto et al. | |
| 2006/0155648 A1 * | 7/2006 | Vandewater | G06F 21/10 705/51 |
| 2009/0044274 A1 * | 2/2009 | Budko | G06F 21/53 726/24 |
| 2009/0177742 A1 * | 7/2009 | Rhoads | G06Q 30/00 709/203 |
| 2011/0154449 A1 * | 6/2011 | Jureczki | H04N 7/17318 726/4 |
| 2012/0159578 A1 * | 6/2012 | Chawla | G06F 21/53 726/4 |

(Continued)

*Primary Examiner* — Maung Lwin
(74) *Attorney, Agent, or Firm* — Arent Fox LLP; Michael Falnberg

(57) ABSTRACT

Disclosed are systems and methods for counteracting unauthorized access to microphone data. An example method include storing, in a data buffer, audio data received from an audio endpoint device, installing, a software driver associated with the audio session, where the software driver prevents access to the audio data by unauthorized software applications, and receiving process identifier data from a software application requesting to access the audio data stored in the data buffer. Furthermore, the method includes determining whether the application requesting access to the audio data is an unauthorized software application and controlling the software driver to prevent access to the audio data by the determined unauthorized software application.

18 Claims, 5 Drawing Sheets

(56) References Cited

U.S. PATENT DOCUMENTS

2012/0317243 A1* 12/2012 Gao .................. H04H 20/95
  709/219
2013/0067050 A1* 3/2013 Kotteri ................ G06F 3/165
  709/223
2014/0068704 A1 3/2014 Grewal et al.

* cited by examiner

SYSTEM AND METHOD OF COUNTERACTING UNAUTHORIZED ACCESS TO MICROPHONE DATA

CROSS-REFERENCE TO RELATED APPLICATIONS

This application claims benefit of priority under 35 U.S.C. 119(a)-(d) to a Russian Application No. 2016116000 filed on Apr. 25, 2016, which is incorporated by reference herein.

FIELD OF TECHNOLOGY

The disclosure herein generally relates to the protection against loss of data, and more particularly, to systems and methods of counteracting unauthorized access to microphone data.

BACKGROUND

In the modern world, users encounter many cyber threats, one of which is unauthorized access to the user's microphone for the purpose of eavesdropping. In order to realize a control of access to the microphone data on the part of processes running on the user's computer it is necessary to perform a filtration of certain requests within the operating system or obtain access to the context of the request data for identification of the processes requesting access, in order to block those processes for which access has not been authorized. In the Windows XP and older operating systems, this functionality has been resolved by means of intercepting traffic in the region of the "KSmixer.sys" kernel component (the Windows Kernel Streaming technology). Requests to read microphone data in the framework of the traffic being intercepted have gone through a special filter in the context of the process reading the microphone data.

With the advent of Windows Vista, a new architecture WASAPI was developed, consisting of many kernel components and a user mode where the Windows Kernel Streaming technology has remained in the "basic variant", while all of the audio traffic has been put through private COM interfaces of new audio drivers, which are registered on the port driver "portcls.sys". These audio drivers can be realized such that the audio traffic with the help of a Direct Access Memory (DMA) controller ends up at once in the user mode buffer, that is, without the involvement of the processor or any supplemental code. And this buffer is mapped into a protected process "audiodg.exe", from which the data is copied with the help of the processor into the buffer of the user process in the context of this same process "audiodg.exe". That is, the controlling filter in the Windows Kernel Streaming technology has become absolutely unsuitable, starting with Windows Vista.

Due to the foregoing, the need arises for a method which is able to intercept audio traffic from microphones linked to the context of the processes reading the data from the microphones in order to protect transmission of audio data.

SUMMARY

Disclosed are systems, methods and computer program products for counteracting unauthorized access to audio data by transmission of audio data from a microphone to processes.

According to one exemplary aspect, a method is disclosed for preventing unauthorized access to audio data. In this aspect, the method includes storing, in a data buffer by an audiodg.exe process, audio data received from an audio endpoint device; installing, in memory of a computer, a software driver associated with the audio session, the software driver being configured to prevent access to the audio data by unauthorized software applications; receiving, by a processor of the computer, process identifier data from a software application requesting to access the audio data stored in the data buffer; determining, by the processor, whether the application requesting access to the audio data is an unauthorized software application; and controlling, by the processor, the software driver to prevent access to the audio data by the determined unauthorized software application.

According to another exemplary aspect, the method includes converting, by the software driver, the audio data to zeroes when the application requesting access to the audio data is determined to be an unauthorized software application.

According to another exemplary aspect, the method includes monitoring for and intercepting, by the processor, requests from the software application to access the audio data stored in the data buffer.

According to another exemplary aspect, the determining of whether the application requesting access to the audio data is an unauthorized software application comprises at least one of monitoring activities of the requesting application to determine whether the application is trusted or not trusted; scanning the requesting application by accessing a database of signatures of known viruses and comparing a signature of the requesting application; and receiving, from a user, a command whether to grant access to the audio data by the requesting application.

According to another exemplary aspect, the method includes directly storing the audio data received from the audio endpoint device in the data buffer; and only granting access to the audio data by the software driver.

According to another exemplary aspect, the method includes instructing the software driver to grant access to the audio data if the application requesting access to the audio data is an authorized software application; processing, by the software driver, the audio data as an audio stream; and transmitting, by the software driver, the audio data to the determined authorized software application.

According to another exemplary aspect, the method includes installing, in the memory, a plurality of software drivers associated respectively with a plurality of audio streams of the audio session, the software drivers being configured to prevent access to the audio streams, respectively, by unauthorized software applications; receiving, by the processor, process identifier data from at least one software application requesting to access one of the plurality of audio streams; determining, by the processor, whether the at least one application requesting access to the audio stream is an unauthorized software application; and controlling, by the processor, the respective software driver to prevent access to the audio stream by the determined unauthorized software application.

According to another exemplary aspect, a system is disclosed for preventing unauthorized access to audio data. In this aspect, the system includes a data buffer; memory; and a processor configured to: store, in the data buffer by an audiodg.exe process, audio data received from an audio endpoint device, install, in the memory, a software driver associated with the audio session, the software driver being configured to prevent access to the audio data by unauthorized software applications; receive process identifier data from a software application requesting to access the audio data stored in the data buffer; determine whether the application requesting access to the audio data is an unauthorized software application; and control the software driver to prevent access to the audio data by the determined unauthorized software application.

According to another exemplary aspect, a non-transitory computer readable medium storing computer executable instructions is disclosed for preventing unauthorized access to audio data. According to the exemplary aspect, instructions are provided for storing, in a data buffer by an audiodg.exe process, audio data received from an audio endpoint device; installing, in memory of a computer, a software driver associated with the audio session, the software driver being configured to prevent access to the audio data by unauthorized software applications; receiving process identifier data from a software application requesting to access the audio data stored in the data buffer; determining whether the application requesting access to the audio data is an unauthorized software application; and controlling the software driver to prevent access to the audio data by the determined unauthorized software application.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of systems, methods and computer program products for counteracting unauthorized access to audio data by transmission of audio data from a microphone to processes. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
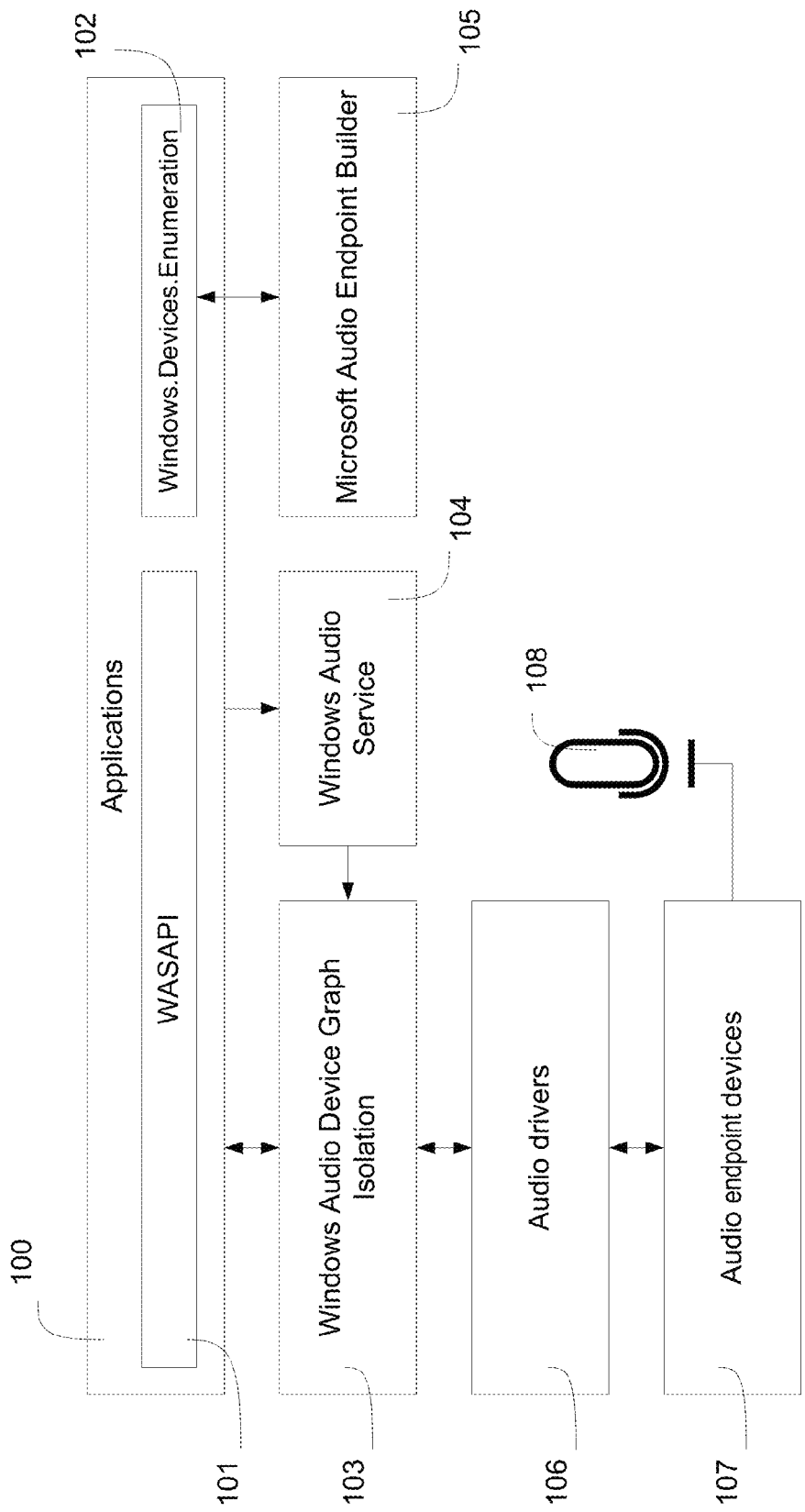
FIG. 1 illustrates a block diagram of a new high-level model of Windows Audio Stack.

To increase the reliability and simplify the development of applications working with audio data, Microsoft has significantly redeveloped the audio stack, which is used in modern operating systems starting with Windows Vista. FIG. 1 illustrates a block diagram of a high-level model of the new audio stack. The basic components of this model are listed and described below. It should be understood that the list of components given in FIG. 1 is not exhaustive, but only includes those components which are used in the context of the present disclosure and/or are important to an understanding of the principles of working with audio data in the context of the new audio stack model.

The Windows Audio Session API ("WASAPI 101") are software interfaces allowing a control of the audio data streams between applications 100 and audio endpoint devices 107. For purposes of this disclosure, the term "audio endpoint device", "audio terminal device" or "audio endpoint" are used synonymously and can be considered a microphone, for example, according to one aspect. It should further be appreciated that the microphone may be embedded in the audio adapter that is connected to it, or it can be connected to a USB-adapter or connected to the device, which in turn is connected to the adapter.

In either case, each audio stream is part of an audio session, which is a combination of all audio streams between applications 100 and a specific audio endpoint device 107, such as a microphone 108. The Windows operating system makes it possible to process each stream separately within an audio session, and also control certain parameters, such as volume, within the entire audio session. It should be noted that an audio session can consist solely of audio data rendering streams or audio data capture streams. In the context of the present disclosure, only audio data capture streams are considered. The applications 100 can use the WASAPI software interfaces in two modes: WASAPI Shared and WASAPI Exclusive. The use of the exclusive mode by one application blocks access to the audio endpoint device for all other applications. Use of the shared mode allows the applications 100 to obtain access to one and the same audio endpoint device 107 at the same time. The component Windows Audio Device Graph Isolation 103 is used to organize shared access to audio data arriving from one audio endpoint device 107.

Windows Audio Device Graph Isolation 103 is an audio stack component designed to transport audio data arriving from an audio endpoint device 107 to applications 100, and it makes it possible to perform various transformations of the data of audio streams during a single audio session, using only the resources of the central processor. For example, Windows Audio Device Graph Isolation 103 can put audio streams from different applications in the same form, indicated in the Windows settings, that is, the same number of channels, digitization frequency, and degree of quantization, or it can perform a mixing of audio streams, and in the case of an audio data capture stream it can copy it for transmission to several applications 100. Windows Audio Device Graph Isolation 103 is realized as a protected process "audiodg.exe", launched in user mode.

Windows Audio Service 104 is a service within the Windows operating system that is designed to create and control audio data streams. This audio stack component allows applications 100 to interact with the protected process "audiodg.exe", direct access to which is limited on their part. Windows Audio Service 104 is also a component which realizes the Windows Audio Policy, which includes a set of rules to be applied within the operating system to audio streams which are accessible in the shared mode within an audio session.

The audio drivers 106 are an interlayer within the audio stack model being described, including a combination of various system drivers maintaining the architecture of said audio stock, and also drivers allowing support of components of other manufacturers. For example, for audio adapters connected to the PCI and PCI express buses, system drivers of the "Port Class" (portcls.sys) are provided within the Windows operating system, including a group of port drivers to realize various audio adapter functions. And in the case of an audio adapter connected to a USB bus, system drivers of the "AVStream" class (Ks.sys) and a driver of the "USB Audio" class (Usbaudio.sys) are provided in the Windows operating system. The main characteristic of the new audio stack model realized within the interlayer of audio drivers 106 is the realization of the Microsoft Wave Real Time (WaveRT) technology, which allows the audio endpoint devices to record audio data without the involvement of the central processor directly into a buffer in user mode, from which the data is read by the protected process "audiodg.exe", realizing the Windows Audio Device Graph Isolation component 103. Access to this buffer from other processes is forbidden and controlled on the part of the operating system.

The audio endpoint devices 107 within the present disclosure are devices situated at one of the ends of the audio data transmission channel, which begins or ends at the application 100. Examples of audio endpoint devices may include, but not limited to, a microphone 108, headphones, acoustic speakers or a CD player. The audio endpoint devices 107 can be connected to audio adapters or be a part of them.

The Microsoft Audio Endpoint Builder 105 is a service of the Windows operating system designed to detect new audio endpoint devices 107, and also keep track of and control the existing ones.

Windows.Devices.Enumeration 102 are software interfaces allowing applications 100 to interact with the Microsoft Audio Endpoint Builder service 105 to obtain information on the existing audio endpoint devices 107 and their use for rendering or capture of audio data.

Figure 2:
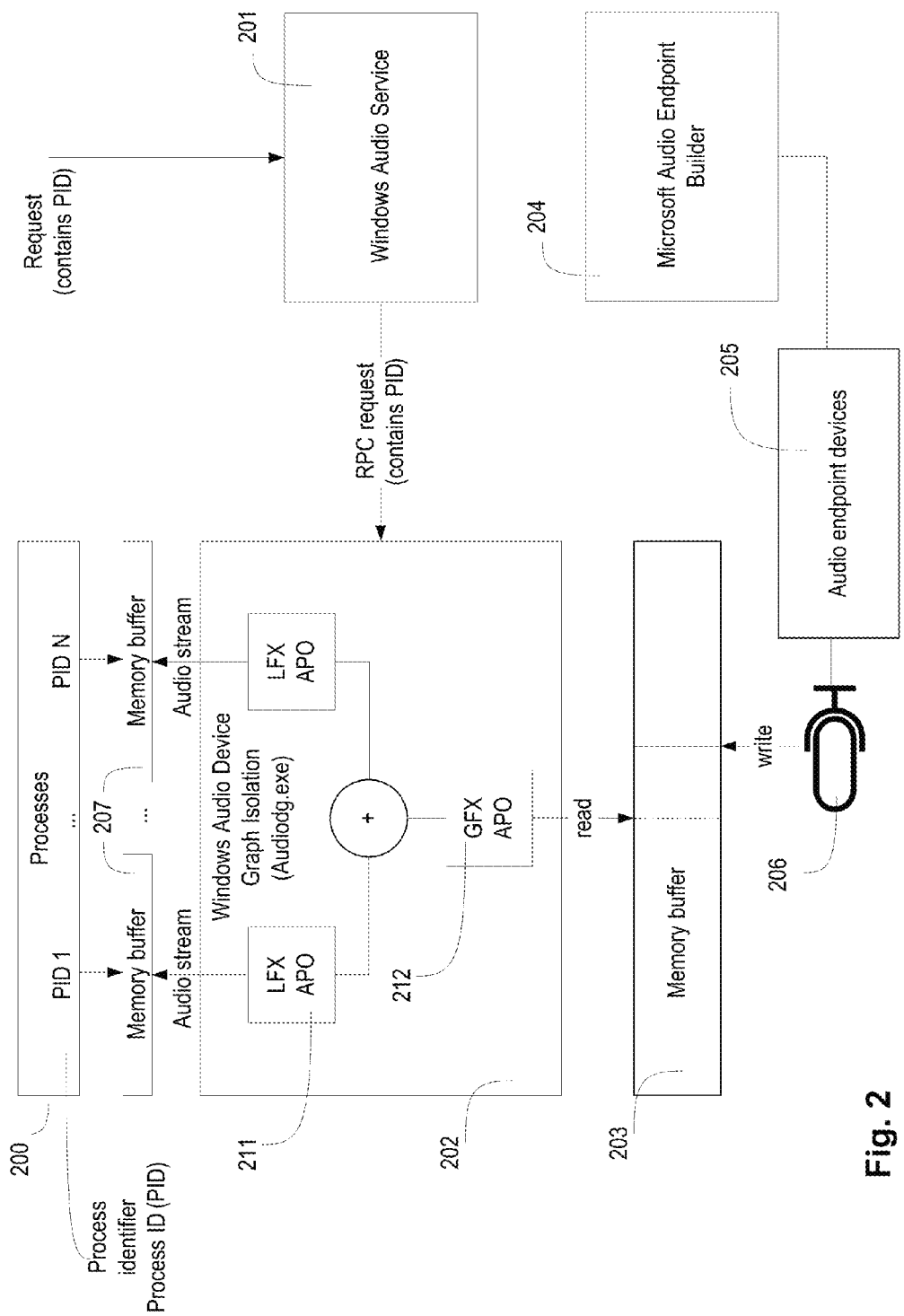
FIG. 2 illustrates a block diagram of an audio subsystem according to an exemplary aspect.

The following description considers certain audio stack components that make up the audio subsystem of the Windows operating system, within which the present disclosure are realized. A block diagram of said audio subsystem is illustrated in FIG. 2. As shown, this diagram describes a scenario in which processes 200 are provided access in shared mode (WASAPI Shared) within an audio session consisting of audio data capture streams being received from an audio endpoint device, being the microphone 206. In the context of this diagram, the concept of processes 200 means the applications being executed at the given moment. If an application is a passive set of instructions, a process is the immediate execution of these instructions. Each process has a unique identifier, the Process ID (in short, PID), by which the given process can be identified.

The main difficulty in the realization of the system and method of counteracting unauthorized access to microphone data is the fact that all audio streams circulating between the processes and the audio endpoint device are the context of a single protected process "audiodg.exe" which realizes the Windows Audio Device Graph Isolation component 202. Since the process is protected, that is, the are access rights restrictions in regard to this process, interaction with this process by the use of standard API functions of the user mode is not possible when performing many operations. Thus, another process using standard API functions of the user mode cannot request information about the internal data of the process "audiodg.exe". For the interaction of each of the processes 200 with the protected process "audiodg.exe" realizing the Windows Audio Device Graph Isolation component 202, the Windows Audio Service 201 of the operating system creates a special cross-process buffer 207, through which audio data is transmitted from one of the audio endpoint devices 205, such as the microphone 206. As mentioned above, keeping track and adding of audio endpoint devices 205 is done with the help of the Windows Microsoft Audio Endpoint Builder service 204 of the operating system.

The interaction of the audio endpoint device, such as the microphone 206, with the protected process audiodg.exe 202 also occurs through a special buffer 203, accessible in user mode. The audio data goes to the buffer 203 directly from the microphone 206 without involvement of the central processor, and then is read by the Windows Audio Device Graph Isolation component 202, and vice versa, it is processed only with the use of resources of the central processor, that is, by software, without the involvement of the resources of the audio adapters to which the audio endpoint devices 205 are connected or of which they form a part.

Before the audio data which has been read from the buffer 203 will be transmitted to the processes 200, it is subjected to processing by the Windows Audio Device Graph Isolation component 202. The main tasks of the Windows Audio Device Graph Isolation component 202 are the transport of audio data arriving from an audio endpoint device, the microphone 206, to the processes 100, and the performance of various transformations of the data of the audio streams in the course of a single audio session. The transformations of the data of the audio streams are done with the help of miniport drivers of the aforementioned WaveRT technology, which are known as Audio Processing Objects (APO). One distinguishes two types of audio processing objects: global effects, abbreviated GFX APO 212, and local effects, abbreviated LFX APO 211. In the context of an audio session, consisting of audio data capture streams, global effects audio processing objects GFX APO 112 are used for the incoming audio stream received from the microphone 206. Then, for each process 200 having requested the creation of an audio stream from the Windows Audio Service 201, the creation of an independent audio stream is done by the Windows Audio Device Graph Isolation component 202 by copying of the incoming stream processed with the aid of the global effects audio processing object GFX APO 112.

According to one exemplary aspect, each independent audio stream corresponds to a single process and is processed with the aid of local effects audio processing objects LFX APO 211. The LFX APO 211, which is loaded windows audio device graph isolation (i.e., the audiodg.exe) records the audio data into the buffers from which they are read by the application. As noted above, the audiodg.exe is a protected process, which enables the system and method to interact with audiodg.exe process only through the windows audio service special service (i.e., "audiosrv.exe". Thus, to create an audio stream, the application accesses the audiosrv service, which, in turn, sends a command to allocate a new thread for the application and while handling ID application that requested the creation of a new audio stream.

According to one exemplary aspect, the number of local effects audio processing objects LFX APO 211 used for each independent audio stream can be the same or different. The nature of the manipulations performed with the data of each independent audio stream with the help of the local effects audio processing objects LFX APO 211 also may differ, since the parameters of the audio data processing objects can be controlled in real time. The local effects audio processing objects LFX APO 211 can be activated individually for each process, which will result in the adding of the local effects audio processing object LFX APO 211 to the audio stream corresponding to the given process. The local effects audio processing objects LFX APO 211 can also be deactivated individually for each process, which will result in the removal of the local effects audio processing object LFX APO 211 from the audio stream corresponding to the given process. The local effects audio processing objects LFX APO 211 are realized in the form of WaveRT miniport drivers, which are installed in the operating system and registered in relation to each specific audio endpoint device 205 by adding the corresponding records to the system registry, after which the local effects audio processing objects LFX APO 211 will be automatically installed by the audio subsystem for the processing of each new audio stream related to an audio endpoint device for which the given local effects audio processing objects LFX APO 211 have been registered.

In order for a process in the shared access mode (WASAPI Shared) to receive access to the audio data arriving from the microphone 206, it formulates and sends a request to the Windows Audio Service 201. This request includes various parameters, including the process identifier (PID). The Windows Audio Service 201 formulates and sends a remote procedure call (RPC) request for the creation of a new data stream to the Windows Audio Device Graph Isolation component 202, transmitting among the parameters of this RPC request the process identifier (PID) which requested the creation of the audio stream. The Windows Audio Service 201 creates a special cross-process buffer 207, by which audio data is transmitted from the microphone 206 to the process having requested the creation of the audio stream. The Windows Audio Device Graph Isolation 202 in turn creates an independent audio stream, related to the aforementioned special buffer 207, through which audio data will be transmitted to the process having requested the creation of the given audio stream. And, finally, the audio subsystem installs the local effects audio processing objects LFX APO 211, registered for the microphone 206, for the processing of the created audio stream.

Figure 3:
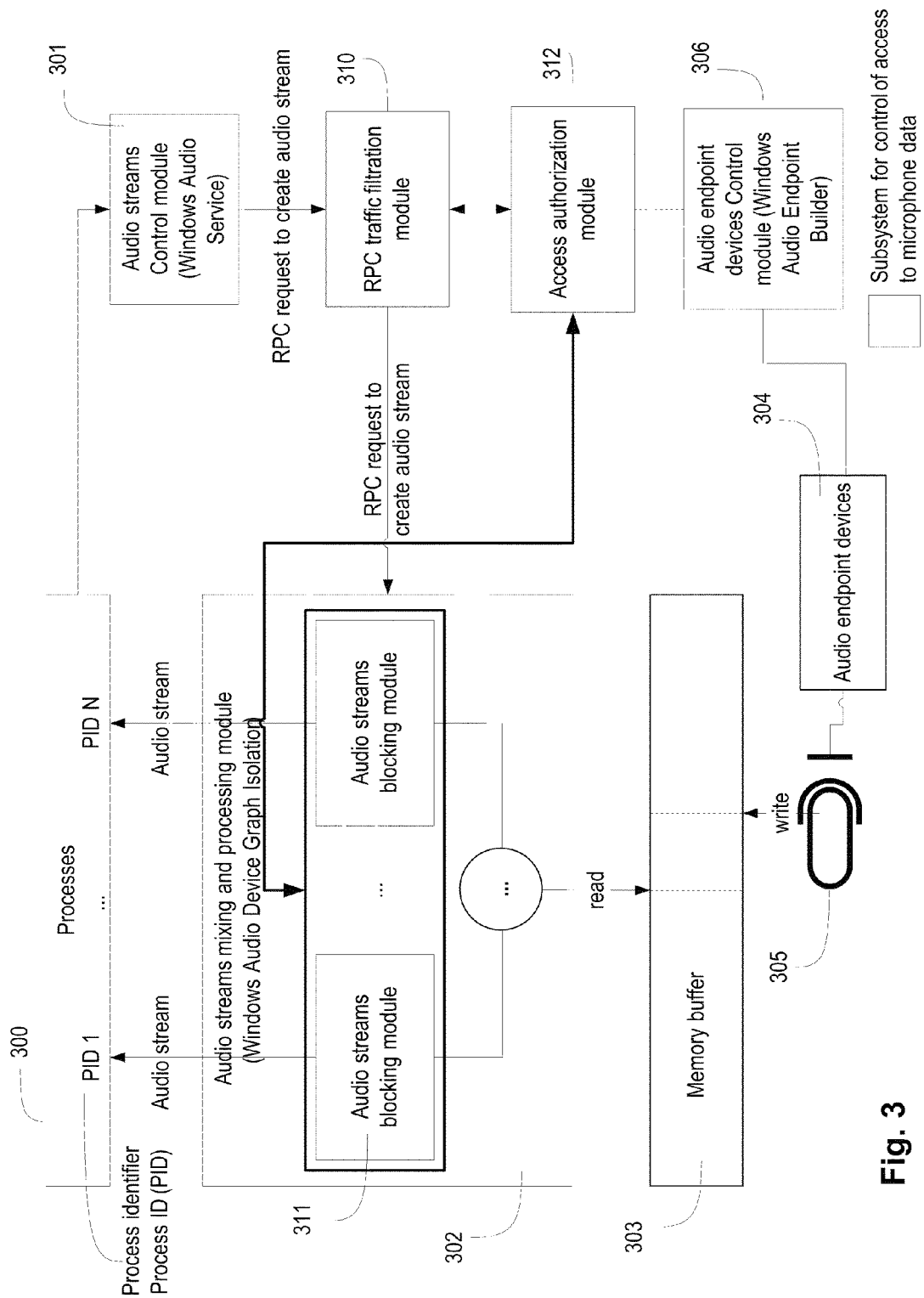
FIG. 3 illustrates a block diagram of a system for counteracting unauthorized access to microphone data according to an exemplary aspect.

FIG. 3 illustrates an exemplary aspect of a system for counteracting unauthorized access to microphone data. This system consists of two subsystems: the above-described audio subsystem, illustrated in FIG. 2, and integrated in said audio subsystem a subsystem for control of access to the microphone data. The audio subsystem can include an audio streams control module 301, with which processes interact via API functions for the creation and control of audio streams, and, according to one aspect, can be the Windows Audio Service 201. Moreover, the audio subsystem can include an audio streams mixing and processing module 302 that is configured to mix audio streams between applications and audio endpoint devices, and also to process audio streams with the help of filters, which in one exemplary aspect may be the protected process Windows Audio Device Graph Isolation 202. Moreover, the audio subsystem can include an audio endpoint devices control module 306 that is configured to add and track audio endpoint devices, which in one exemplary aspect can be the Windows Audio Endpoint Builder service 204.

The subsystem for control of access to microphone data can include a RPC traffic filtration module 310, an audio streams blocking module 311 and an access authorization module 312. The RPC traffic filtration module 310 is configured to monitor of RPC traffic between the audio streams control module 301 and the audio streams mixing and processing module 302, in order to detect RPC requests for creation of audio streams related to an audio endpoint device which is the microphone, and to determine the process identifiers (PID) for which the creation of audio streams is being requested. This design makes it possible to solve the aforementioned problem of identification of processes 300 receiving audio data from the microphone 305, in that all the audio streams circulating between the processes 300 and the microphone 305 are the context of a single protected process "audiodg.exe" (the audio streams mixing and processing module 302).

The audio streams blocking module 311 is installed for each new audio stream from the audio session related to the audio endpoint device which is the microphone 305, as a local effects audio processing object LFX APO 211 inside the audio streams mixing and processing module 302. In one exemplary aspect, the audio streams blocking module 311 is in the form of a driver, such as a WaveRT miniport driver. The audio subsystem automatically installs the audio streams blocking module 311 for each new audio stream within the audio session related to each audio endpoint device from the group of audio endpoint devices 304 for which the audio streams blocking module 311 is registered as a local effects audio processing object LFX APO 211. In one exemplary aspect, the automatic installation of the audio streams blocking module 311 mentioned in the previous sentence is done by the audio streams mixing and processing module 302. After installation, the audio streams blocking module 311 sends a request to the access authorization module 312 to check the authorization of the process in regard to gaining access to the data of the audio stream for which the given audio streams blocking module 311 was installed.

To perform the check, the access authorization module 312 receives or requests from the RPC traffic filtration module 310 the process identifier in regard to which said authorization check is being requested. It should be noted that the audio streams blocking module 311 does not possess information as to which process the audio stream for which it has been installed corresponds to. Neither does the RPC traffic filtration module 310 possess such information. The coordination of the request dispatched by the audio streams blocking module 311 with the process identifier obtained by the RPC traffic filtration module 310, which is equivalent to coordinating the audio stream with the process, is done by the access authorization module 312.

The primary purpose of the audio streams blocking module 311 is to prevent access to the audio stream data by an unauthorized process. For this, the audio streams blocking module 311 performs a zeroing of the data of the audio stream for which the process requesting its creation was found to be unauthorized by the access authorization module 312.

The access authorization module 312 is connected to the RPC traffic filtration module 310 and the audio streams blocking module 311 and is designed to perform a check of the authorization of the processes by the aforementioned process identifiers for access to the data of the audio streams related to the audio endpoint device, such as the microphone 305. The process authorization module can perform both an independent checking of the authorization of the process to obtain access to the data of the audio streams related to the audio endpoint device from the group of audio endpoint devices 304 and also send requests in regard to the process being checked to one or more additional security modules.

In particular, according to an exemplary aspect, the process authorization module can query a particular module regarding its assessment of a particular process and determine a response based on the module's response. For example, transfers of process authorization module PID to an antivirus module, which can returns information of whether it is a trusted process or "not infected" or, alternatively, if the antivirus module is not known, this process it can carry out a range of measures in relation to the process and scan it for malicious code, and return the result. Thus, according to this aspect, the process authorization module can send a request to any local or remote security module, indicating the process with PID, and requesting an assessment of the verdict of the module with respect to a particular process. These modules can be: anti-virus module, HIPS module (application control), firewall, system watcher, and any other modules that can assess a process, as would be known to one skilled in the art. After receiving a set of modules from the verdicts of this process, the process authorization module PAM authorizes only those processes for which all the verdicts were that this process is not malicious.

According to one exemplary aspect, additional security modules can include a module for control of activity of processes, designed to regulate actions on the part of the processes, such as access to the file system, to the system registry, or interaction with other processes, dividing up all processes into: trusted, not trusted, processes with weak restrictions and processes with strong restrictions. According to another aspect, additional security modules can further include an antivirus module configured to designed to look for viruses with the help of a database of signatures (descriptions of known viruses and other malicious applications), and to remove or quarantine the corresponding objects and the data related to them. According to another aspect, additional security modules can further include a threat neutralization module configured to detect unwanted content, discover attacks or threats in real time, take steps to close down any suspicious processes, block Internet traffic, and also restore the system to its last known safe condition. According to yet another aspect, additional security modules can also include a user feedback module that can alert the user as to all attempts by processes to gain access to the microphone data, so that the user can choose to allow a given process access to the microphone or not, and also to provide the user with the option of blocking access to the microphone by default for all processes.

Thus, the access authorization module 312 can identify a process as unauthorized on the basis of verdicts from outside security modules. For example, a process may be identified as unauthorized if the process is malicious or if the process is not authorized by the user to access the microphone data.

In one exemplary aspect, the access authorization module 312 is connected to the audio endpoint devices control module 306 to follow the adding of a new audio endpoint device to the group of audio endpoint devices 304. For each new audio endpoint device, the access authorization module 312 performs a registration of the audio streams blocking module 311, registered as the local effects audio processing object LFX APO 211. In another exemplary aspect, the access authorization module 312 protects against changing and removal of all records of the system registry in which the audio streams blocking module 311 is listed as the local effects audio processing object LFX APO 211.

Figure 4:
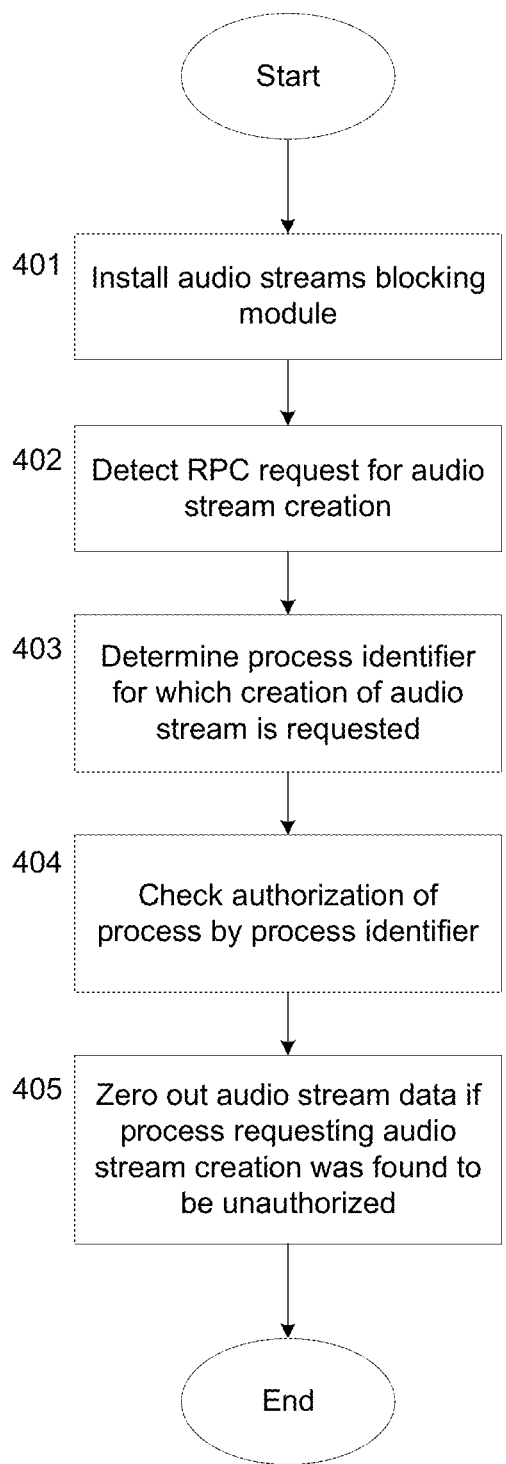
FIG. 4 illustrates a flowchart for a method of counteracting unauthorized access to microphone data according to an exemplary aspect.

FIG. 4 shows a block diagram of an exemplary aspect of a method of counteracting unauthorized access to microphone data. According to this block diagram, in step 401, with the aid of the access authorization module 312, the audio streams blocking module 311 can be installed as the local effects audio processing module LFX APO inside the audio streams mixing and processing module 302 for each audio endpoint device which is a microphone 305, accounted for by the audio endpoint devices control module 306. The local effects audio processing module LFX APO is used as the audio streams mixing and processing module 302 for each new audio stream relating to each audio endpoint device which is a microphone 305 for which the given local effects audio processing module LFX APO has been installed.

Next, in step 402, using the RPC traffic filtration module 310, RPC traffic between the audio streams control module 301 and the audio streams mixing and processing module 302 is monitored, an RPC request is discovered for creation of an audio stream relating to the audio endpoint device which is the microphone 305, and the process identifier is determined for which the creation of the aforementioned audio stream is being requested.

During the creation of the new audio stream, the audio streams mixing and processing module 302 applies to the stream the local effects processing module of audio streams LFX APO, which were installed for the audio endpoint device related to the new audio stream. Since, in step 401, for each audio endpoint device a microphone audio streams blocking module 311 was installed as the local effects processing module of audio streams LFX APO, there will be applied to the new audio stream related to the audio endpoint device which is a microphone, in step 403, the audio streams blocking module 311, which will send an authorization request to the access authorization module 312 immediately after initialization.

In response to this request, in step 404, the access authorization module 312 will use the identifier of the process requesting the creation of the audio stream, received in step 402, to check the authorization of the process to gain access to the data of the mentioned audio stream. Based on the results of the check in step 405, the audio streams blocking module 311 zeroes the data of the mentioned audio stream if the process requesting the creation of the mentioned audio stream was found to be unauthorized with the aid of the access authorization module 312.

Figure 5:
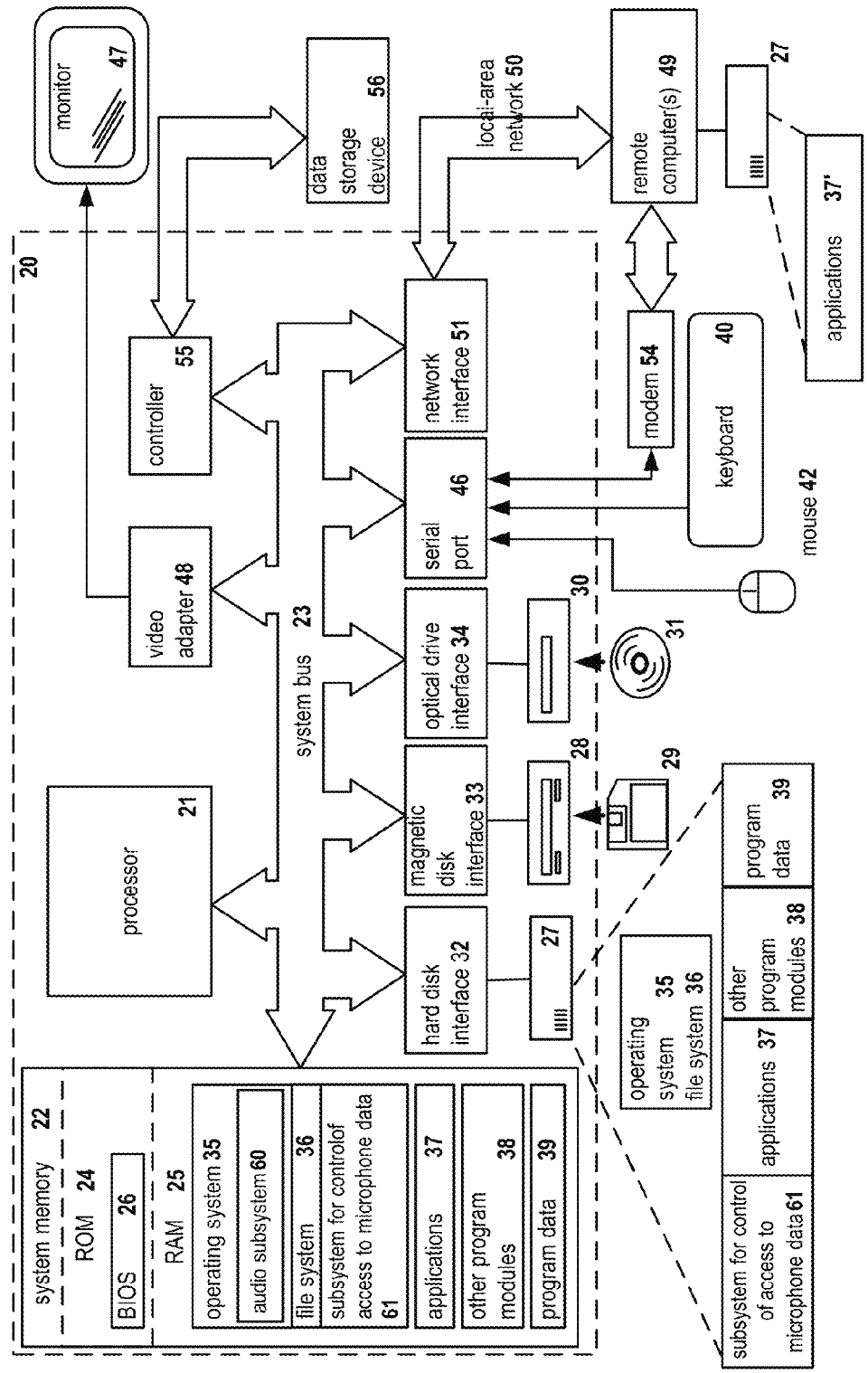
FIG. 5 illustrates an example of a general-purpose computer system on which the disclosed systems and method can be implemented.

FIG. 5 illustrates an example of a general-purpose computer system (which may be a personal computer or a server) on which the disclosed systems (including one or more of the modules) and the method can be implemented according to an example aspect. As shown, the computer system 20 may include a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, which in turn contains audio subsystem 60, depicted in FIG. 2, as well as subsystem for control of access to microphone data 61, depicted in FIG. 3, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 5. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

As noted above, in various aspects, the systems and methods described in the present disclosure in terms of modules. It is reiterates that the term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 7 above). Accordingly, each module can be realized in a variety of suitable configurations, and should not be limited to any example implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for preventing unauthorized access to audio data, the method comprising:
  storing, in a data buffer by an audiodg.exe process, the audio data received from an audio endpoint device;

installing, in a memory of a computer, a software driver associated with an audio session, the software driver being configured to prevent access to the audio data by unauthorized software applications;

receiving, by a processor of the computer, process identifier data from a software application requesting access to the audio data stored in the data buffer;

determining, by the processor, whether the software application requesting access to the audio data is an unauthorized software application based upon the process identifier data, wherein the unauthorized software application comprises an application having at least one process that is identified as untrusted, malicious, or not authorized by a user to access the audio data;

controlling, by the processor, the software driver to prevent access to the audio data by the determined unauthorized software application; and converting, by the software driver, the audio data to zeroes when the software application requesting access to the audio data is determined to be an unauthorized software application-based on received process identifier data.

2. The method according to claim 1, further comprising monitoring for and intercepting, by the processor, a request from the software application to access the audio data stored in the data buffer.

3. The method according to claim 1, wherein the determining of whether the software application requesting access to the audio data is an unauthorized software application comprises at least one of:
monitoring activities of the requesting software application to determine whether the software application is trusted or not trusted;
scanning the requesting software application by accessing a database of signatures of known viruses and comparing a signature of the requesting software application; and
receiving, from a user, a command whether to grant access to the audio data by the requesting software application.

4. The method according to claim 1, further comprising:
directly storing the audio data received from the audio endpoint device in the data buffer; and
only granting access to the audio data by the software driver.

5. The method according to claim 1, further comprising:
instructing the software driver to grant access to the audio data if the software application requesting access to the audio data is determined as an authorized software application;
processing, by the software driver, the audio data as an audio stream; and
transmitting, by the software driver, the audio data to the determined authorized software application.

6. The method according to claim 1, further comprising:
installing, in the memory, a plurality of software drivers associated respectively with a plurality of audio streams of the audio session, the software drivers being configured to prevent access to the audio streams, respectively, by the unauthorized software applications;
receiving, by the processor, process identifier data from at least one software application requesting to access one of the plurality of audio streams;
determining, by the processor, whether the at least one software application requesting access to the audio stream is an unauthorized software application; and controlling, by the processor, the respective software driver to prevent access to the audio stream by the determined unauthorized software application.

7. A system for preventing unauthorized access to audio data, the system comprising:
a data buffer;
a memory; and
a processor configured to:
store, in the data buffer by an audiodg.exe process, the audio data received from an audio endpoint device,
install, in the memory, a software driver associated with an audio session, the software driver being configured to prevent access to the audio data by unauthorized software applications;
receive process identifier data from a software application requesting to access the audio data stored in the data buffer;
determine whether the software application requesting access to the audio data is an unauthorized software application based upon the process identifier data, wherein the unauthorized software application comprises an application having at least one process that is identified as untrusted, malicious, or not authorized by a user to access the audio data;
control the software driver to prevent access to the audio data by the determined unauthorized software application; and
convert the audio data to zeroes when the software application requesting access to the audio data is determined to be an unauthorized software application based on received process identifier data.

8. The system according to claim 7, wherein the processor is further configured to monitor for and intercept requests from the software application to access the audio data stored in the data buffer.

9. The system according to claim 7, wherein the processor is further configured to determine whether the software application requesting access to the audio data is an unauthorized software application by at least one of:
monitoring activities of the requesting software application to determine whether the software application is trusted or not trusted;
scanning the requesting software application by accessing a database of signatures of known viruses and comparing a signature of the requesting software application; and
receiving, from a user, a command whether to grant access to the audio data by the requesting software application.

10. The system according to claim 7, wherein the processor is further configured to:
directly store the audio data received from the audio endpoint device in the data buffer; and
only grant access to the audio data by the software driver.

11. The system according to claim 7, wherein the processor is further configured to instruct the software driver to grant access to the audio data if the software application requesting access to the audio data is determined as an authorized software application; and the software driver is configured to process the audio data as an audio stream and transmit the audio data to the determined authorized software application.

12. The system according to claim 7, wherein the processor is further configured to:
install, in the memory, a plurality of software drivers associated respectively with a plurality of audio streams of the audio session, the software drivers being configured to prevent access to the audio streams, respectively, by the unauthorized software applications;

receive process identifier data from at least one software application requesting to access one of the plurality of audio streams;

determine whether the at least one software application requesting access to the audio stream is an unauthorized software application; and control the respective software driver to prevent access to the audio stream by the determined unauthorized software application.

13. A non-transitory computer readable medium storing computer executable instructions for preventing unauthorized access to audio data, including instructions for:

storing, in a data buffer by an audiodg.exe process, the audio data received from an audio endpoint device;

installing, in a memory of a computer, a software driver associated with an audio session, the software driver being configured to prevent access to the audio data by unauthorized software applications;

receiving process identifier data from a software application requesting to access the audio data stored in the data buffer;

determining whether the software application requesting access to the audio data is an unauthorized software application based upon the process identifier data, wherein the unauthorized software application comprises an application having at least one process that is identified as untrusted, malicious, or not authorized by a user to access the audio data;

controlling the software driver to prevent access to the audio data by the determined unauthorized software application; and converting the audio data to zeroes when the software application requesting access to the audio data is determined to be an unauthorized software application based on received process identifier data.

14. The non-transitory computer readable medium of claim 13, further comprising instructions for monitoring for and intercepting requests from the software application to access the audio data stored in the data buffer.

15. The non-transitory computer readable medium of claim 13, wherein the instructions for determining of whether the software application requesting access to the audio data is an unauthorized software application comprises at least one of:

monitoring activities of the requesting software application to determine whether the software application is trusted or not trusted;

scanning the requesting software application by accessing a database of signatures of known viruses and comparing a signature of the requesting software application; and receiving, from a user, a command whether to grant access to the audio data by the requesting software application.

16. The non-transitory computer readable medium of claim 13, further comprising instructions for:

directly storing the audio data received from the audio endpoint device in the data buffer; and only granting access to the audio data by the software driver.

17. The non-transitory computer readable medium of claim 13, further comprising instructions for:

instructing the software driver to grant access to the audio data if the software application requesting access to the audio data is determined as an authorized software application;

processing, by the software driver, the audio data as an audio stream; and transmitting, by the software driver, the audio data to the determined authorized software application.

18. The non-transitory computer readable medium of claim 13, further comprising instructions for:

installing, in the memory, a plurality of software drivers associated respectively with a plurality of audio streams of the audio session, the software drivers being configured to prevent access to the audio streams, respectively, by the unauthorized software applications;

receiving process identifier data from at least one software application requesting to access one of the plurality of audio streams;

determining whether the at least one software application requesting access to the audio stream is an unauthorized software application; and controlling the respective software driver to prevent access to the audio stream by the determined unauthorized software application.

* * * * *